March 22, 1966   V. KATAJA   3,241,691
EQUIPMENT USED IN HANDLING OF CHEESE DISCS
Filed June 28, 1963   3 Sheets-Sheet 1
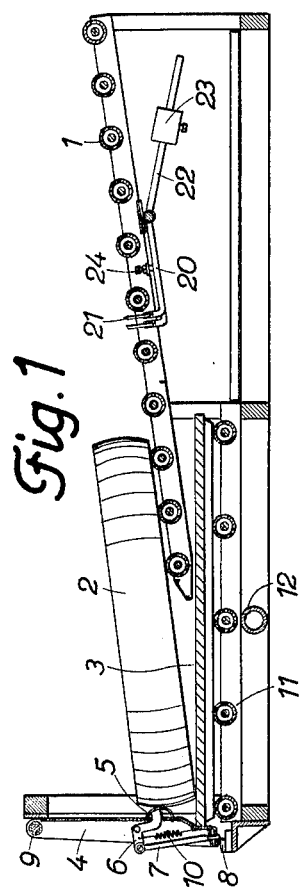
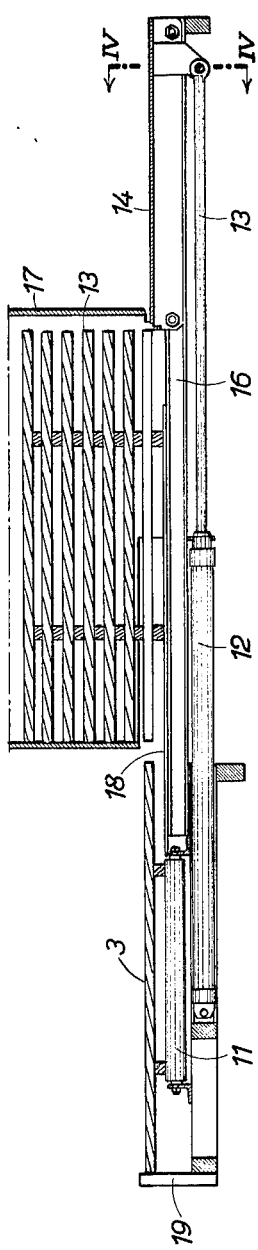
INVENTOR
Väinö Kataja
BY
Michael J. Striker
ATTORNEY

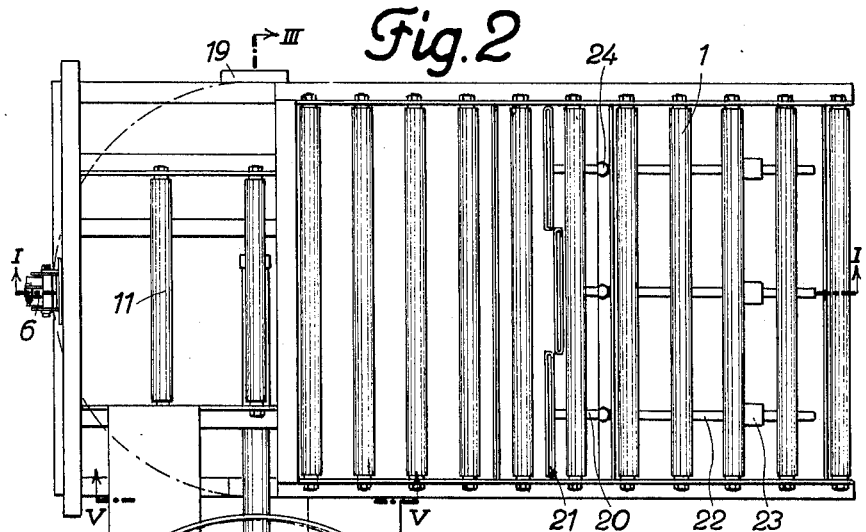
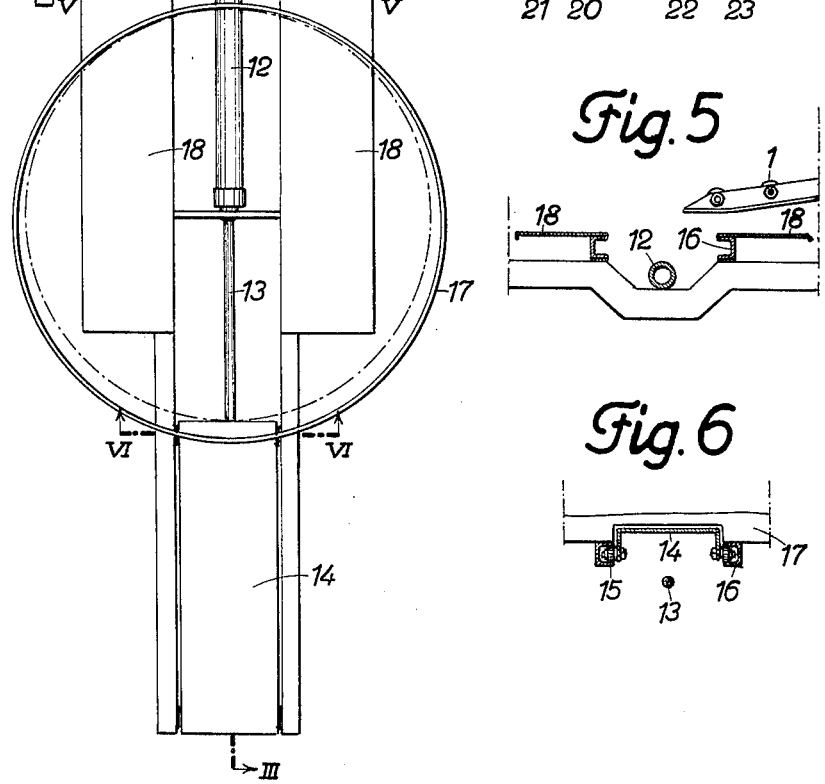
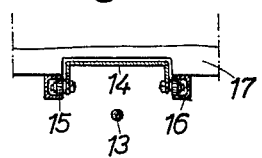

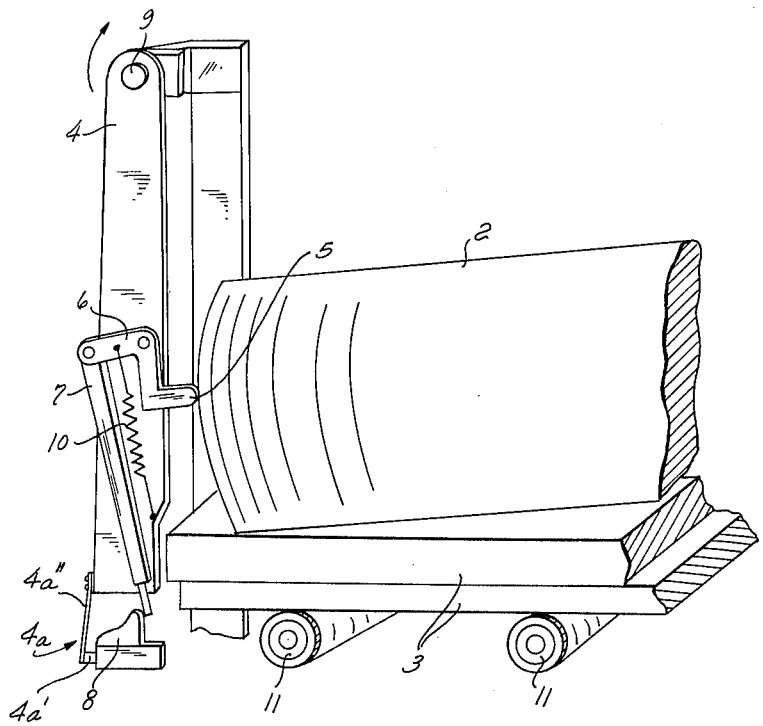

United States Patent Office 3,241,691
Patented Mar. 22, 1966

3,241,691
EQUIPMENT USED IN HANDLING OF
CHEESE DISCS
Väinö Kataja, Traktorintie 11, Helsinki, Finland
Filed June 28, 1963, Ser. No. 291,492
Claims priority, application Finland, July 4, 1962,
1,284/62
5 Claims. (Cl. 214—6)

This invention relates to equipment used in handling of cheese discs.

Many different methods are in use for handling of the cheese discs during their development into the final product. During this procedure the discs are being moved along from one place of operation to another on cheese plates or pallets. The known methods have, however, several disadvantages. For instance, the washing of the cheese discs while on the plates results in the formation of mould on the cheese surface and on the plate due to the moisture between the cheese disc and the plate. The mould again means additional washing procedures.

In order to overcome the above disadvantage there lately has been adopted a way of washing the cheese discs without the use of plates. In this case the cheese plates are removed before the cheese discs are put into the washing basin. The removal of the cheese discs from the plates is carried out simply by turning over the disc by using a suitable turning device, so that the cheese plate can be taken off from the top of the cheese disc.

With this procedure, however, the arranging of the cheese plates underneath the washed cheese discs is difficult without the use of human labour, and besides this the centering of the cheese on the middle of its plate further increases the difficulty.

The aim of this invention is to solve the above problems, and the equipment according to the invention is characterized in that it comprises a shifting device for removing the cheese plate from a stack of such plates, and further a conveyer device for placing the cheese discs one by one on top of the cheese plates that have been removed from the plate stack.

The free cheese plates are then collected to form a stack at the end of the shifting device. Herein it is of great advantage that the shifting device, while removing the cheese plates one by one from the stack, always catches the lowest plate and pushes it out from under the stack.

In order to get the cheese disc to place itself onto the central part of the plate, the present invention contains a very practical embodiment characterized in that the cheese disc, while being placed on the plate, pushes the same against a suitably arranged stop means at the instant it leaves the conveyer device, whereupon it acts on a release device which releases the cheese plate in such a way that it can pass along together with the cheese disc. In this it is preferable to arrange the stop means to cooperate with the shifting device, such that the stop means, when turning aside, gives an impulse to the shifting device for removing the following cheese plate from the stack.

The invention is further described by the following specification and the accompanying drawings showing one of the embodiments of the invention. In the drawings FIGURE 1 shows a section of a device according to the invention along the line I—I of FIGURE 2.

FIGURE 2 shows the device as seen from above.

FIGURE 3 is a section of the device on line III—III of FIGURE 2.

FIGURE 4 is a section on line IV—IV of FIGURE 3.

FIGURE 5 is a section of the device on line V—V of FIG. 2.

FIGURE 6 is a section of the device on line VI—VI of FIG. 2.

FIGURE 7 is a side elevation of the stop member and switch release.

In the drawings the reference numeral 1 designates an inclining roller gear bed, along which the cheese disc 2 moves by its own weight. From the end of the roller gear bed the cheese disc 2 falls onto the top of the cheese plate 3 and pushes the plate against a stop member 4 (FIGURE 1). The cheese plate 3 stops there, but the cheese disc 2 continues to slide along the plate surface due to its motive effect until it meets one end of the double-armed lever 5 pivoted on the stop member 4 as an extension to this. This one end of arm 5 extends over the cheese plate to such an extent that the disc will be centered when it engages the arm 5. On the opposite end of this double-armed lever is pivoted a trigger release 7 whose free end rests against a stop 8 on the frame. Thus, when the cheese disc 2 pushes against the one end of the double-armed lever 5, this will lift itself against the effect of spring 10, whereby the trigger 7 is released from the stop 8. The lower end of stop member 4 is thus being released so that the stopper can pivot about its axis 9. As the cheese disc 2 still has motive energy, it will proceed together with the cheese plate 3 along the roller gear bed 11, pushing the stop member 4 out of its way. By means of the arresting action of stop member 4 and the action of the combined trigger and release device, the cheese disc 2 is centered on the centre of the cheese plate 3. Without such centering devices the cheese disc could not be centered on its plate.

As soon as the stop member 4 gets disconnected from the cheese disc 2, it will act on the normally open switch 4a whose one contact 4a' is mounted on the stop 8 while its other contact or actuating member 4a" is mounted on stop member 4. Switch 4a is normally open; in other words, the circuit is interrupted while member 4a" depresses contact button 4a'. As stop member 4 swings out of the way of a loaded cheese plate, button 4a' is released, the circuit completed, and the pusher means operated. This causes the plate shifting device to place the next cheese plate 3 on the roller gear bed 11 which is located underneath the lower end of the inclining roller gear bed 1 (FIGURE 3). This shifting device consists of a pneumatic cylinder 12, secured to the frame of the device. The piston rod 13 of the cylinder 12 is pivoted to a carrier 14, which is carried by rollers 15 along rails 16 placed transversely relative the plate shifting gear beds 1 and 11.

When the plate shifting gear bed is in idle position, the carrier 14 stands behind the stack of cheese plates arranged inside of a cylindrical magazine 17. The bottom of this magazine is open in such way that the lowest cheese plate in the stack is free to move towards the plate conveyer 11. The stack of cheese plates is carried by broad supporting bars 18 secured to rails 16.

When stop member 4 operates the switch 4a, the piston rod 13 of cylinder 12 is drawn into the cylinder, whereupon the carrier 14 in FIGURE 3 moves to the left. The carrier 14 pushes the lowest cheese plate in front of it along the supporting bars 18. When this plate has been moved from the stack inside magazine 17 the remaining cheese plates will fall onto the carrier 14. The carrier 14 brings the plate 3 right up to the limit stopper 19, when the cheese plate is standing in conveyor 11, ready to receive the next cheese disc. Hereafter the piston rod 13 of cylinder 12 immediately pushes the carrier 14 into its starting position, whereupon the stack of cheese plates inside magazine 17 will fall onto supporting bars 18.

On the frame of the roller gear bed 1 is mounted a scraper device which follows the form of the cheese bottom surface and removes from it any eventual moisture and slime. The scraper device consists of three or several double-armed levers, the ends of those arms 20, which reach up to the space between the rolls of the roller gear bed 1, being provided with flexible scraper organs 21, the combined action area of which cover the whole width of the roller gear bed 1. The opposite arms 22 of the levers are provided with adjustable weights 23, by aid of which the pressure from the scrapers 21 against the surface of the cheese disc can be regulated. The height of the scrapers 21 relative the roller gear bed 1 is made adjustable by means of adjustment screws 24. There may also be arranged scrapers above the roller gear bed 1 for cleaning of the top surface of the cheese discs. In order to keep the scrapers clean, a water spraying arrangement can be used for the purpose. Furthermore, there can even be used compressed air for drying the cheese discs at parts where the scraping has taken place.

The above specification and the thereto referring drawings are, of course, only intended to illustrate the inventive idea of the invention. Its various embodiments may thus vary considerably within the scope and limits of the claims. This especially refers to the conveyer devices 1 and 11, which for instance also can be of a belt-driven type.

Moreover, conveyers with force-feeding may even be used, in which case the conveyer 1 can preferably be arranged to be horizontal. In such case that conveyers 1 and 11 are arranged with force-feeding, it is advantageous to synchronize these with one another and with the cheese plate shifting device.

The pneumatic cylinder of the cheese plate shifting device may also be replaced by a hydraulic cylinder or by an electric motor. Besides, the shifting device can also be arranged to take the uppermost cheese plate 3 from the stack rather than the lowest one.

What I claim is:

1. In an automatic loading device for large solid objects or the like, the combination of downwardly inclined guide means for guiding a plurality of said objects in one direction along said downwardly inclined guide means, said guide means having a bottom end; pusher means for pushing a plurality of pallets one by one in a direction transverse to said one direction beneath the bottom end of said guide means with an edge portion of the pushed pallet located forwardly of said bottom end of said guide means; and releasable stop means including a member movable between a working position extending upwardly beyond said edge portion of said pallet for temporarily stopping an object sliding downward on said inclined guide means at a positition in which a front face of said object is substantially aligned with said edge portion of said pallet to center said object on said pallet, and a released position permitting movement of said pallet with the centered object thereon beyond said stop means, said stop means including locking means movable between a locking position holding said member in said working position and an unlocking position permitting said member to move to said released position, and trigger means engaged by said object when the latter moves to said centered position, said trigger means being operatively connected to said locking means for moving the latter during the last part of the movement of said object into said centered position to said unlocked position.

2. In an automatic loading device for large solid objects or the like, the combination of downwardly inclined guide means for guiding a plurality of said objects in one direction along said downwardly inclined guide means, said guide means having a bottom end; pusher means for pushing a plurality of pallets one by one in a direction transverse to said one direction beneath the bottom end of said guide means with an edge portion of the pushed pallet located forwardly of said bottom end of said guide means; and releasable stop means including a member movable between a working position extending upwardly beyond said edge portion of said pallet for temporarily stopping an object sliding downward on said inclined guide means at a position in which a front face of said object is substantially aligned with said edge portion of said pallet to center said object on said pallet, and a released position permitting movement of said pallet with the centered object thereon beyond said stop means, said stop means including locking means movable between a locking position holding said member in said working position and an unlocking position permitting said member to move to said released position, and trigger means engaged by said object when the latter moves to said centered position, said trigger means being operatively connected to said locking means for moving the latter during the last part of the movement of said object into said centered position to said unlocked position; and means co-operating with said stop means during movement thereof from said working position to said released position for controlling said pusher means.

3. In an automatic loading device for large cheese wheels or the like the combination comprising: a support; a loading station on said support; a stack of empty pallets on said support at a first location remote from said loading station, each of said pallets of said stack being adapted to receive a cheese wheel thereon; slide means intermediate said stack and said loading station; pusher means cooperating with said slide means for removing successive ones of said pallets from said stack and pushing said pallets in a first direction along said slide means to said loading station; moving means on said support downwardly inclined and extending in a second direction transversely of said first direction toward, and terminating at, said loading station above the empty pallet, said moving means enabling movement of a cheese wheel to said loading station and said pallet; combined stop and control means for holding the empty pallet at said loading station until said cheese wheel moved by said moving means has reached a position at which is centered with respect to said pallet, said combined stop and control means including abutment means positioned forwardly of said loading station in said second direction, said abutment means having a retaining arm swingably positionable and releasably lockable ahead of said pallet in said second direction; and actuating means cooperating with said pusher means and said combined stop and control means and including trigger means on said abutment means adapted to operate upon engagement with a portion of said cheese wheel upon the latter reaching a centered position for unlocking said arm and permitting it to swing away from the loaded pallet whereby to permit same to move beyond said loading station toward said second location, while substantially simultaneously actuating said pusher means for substituting an empty pallet for said loaded pallet.

4. A device as defined in claim 3, further comprising a housing at least partially surrounding said stack of pallets on said slide means, said housing having a lower edge upwardly spaced from said slide means by a distance just exceeding the height of individual ones of said pallets; and wherein said pusher means comprises a cylinder having a piston and means operatively connected to said piston and adapted to reciprocate in the space between said lower edge of said housing and said slide means for engaging, upon actuation of said piston, the lowermost one of said pallets in said stack and pushing it from beneath the stack and along said slide means to said loading station.

5. A device as defined in claim 1, further comprising cleaning means for removing mold deposits from at least one surface of said cheese wheels, said guide means having an upper face and said cleaning means being secured therebelow and including lever means pivotable about an axis extending transversely of said one direction, flexible scraper means carried by the free ends of said lever means and extending through said guide means and upwardly of said upper face thereof and being adapted to engage the underside of a cheese wheel moving along said upper face, and an adjustable counter-weight operatively connected to said lever means for permitting regulation of the pressure exerted by said scraper means on the underside of said cheese wheels.

References Cited by the Examiner
UNITED STATES PATENTS

| 2,875,907 | 3/1959 | Locke | 214—6 |
| 2,880,558 | 4/1959 | Wilson | 214—6 |

GERALD M. FORLENZA, *Primary Examiner.*

HUGO O. SCHULZ, *Examiner.*

J. JONES, M. TEMIN, *Assistant Examiners.*